*INVENTOR*
HENRY J. STINGER
BY William C. Babcock ATTORNEY

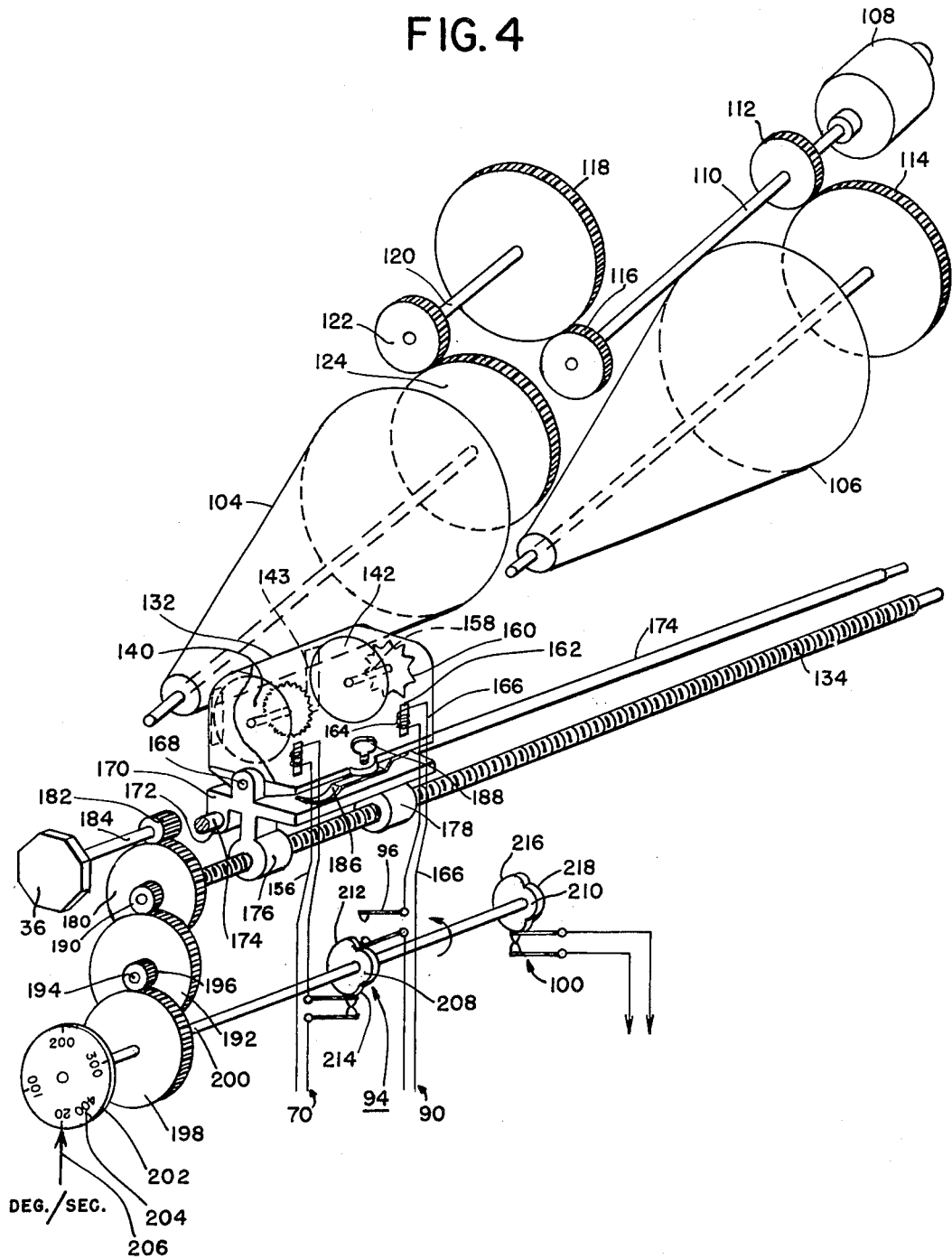

United States Patent Office 2,749,491
Patented June 5, 1956

2,749,491

VARIABLE FREQUENCY GENERATING MEANS AND MOTOR CONTROL

Henry J. Stinger, Wilmington, Del., assignor to General Mills, Inc., a corporation of Delaware Application April 26, 1952, Serial No. 284,623

20 Claims. (Cl. 318—11)

The present invention relates to an improved speed control system for devices requiring a wide range of operating speeds with high accuracy, and more particularly to an improved signal generator for supplying a control frequency to such a system.

Various devices are known in which it is essential to operate a driving motor at a wide range of accurately controlled speeds. In some cases the desired accuracy has been achieved by comparison of the driving motor speed with a reference frequency of some sort. The present invention relates to such devices and to improvements which permit accurate control over a wide and continuous frequency range and to accurate generation of the desired reference signals.

Accordingly, it is one object of the present invention to provide a motor control system in which the driving motor speed is controlled by comparison with standard reference frequencies throughout a wide range.

Another object is a variable speed motor control system in which the driving motor is always operated faster than the reference shaft, with an eddy current clutch and brake interposed between the motor and load to synchronize the load shaft speed with the reference shaft.

A further object is the provision of a motor control system in which a plurality of reference motors are utilized and coupled in a novel and improved fashion for provision of a wide range of reference frequencies.

Still another object is the provision of an improved electromechanical oscillator supplying driving frequencies for the reference motors throughout a wide range of comparison.

Another object is the provision of an electromechanical oscillator in which a rotating conical surface drives a signal generator at a wide range of frequencies.

Other objects and advantages of the invention will be apparent from the following specification in which certain preferred embodiments are described.

In the drawings which accompany this specification,

Fig. 4 is a partial perspective view showing further details of the signal generating unit.

Figure 1:
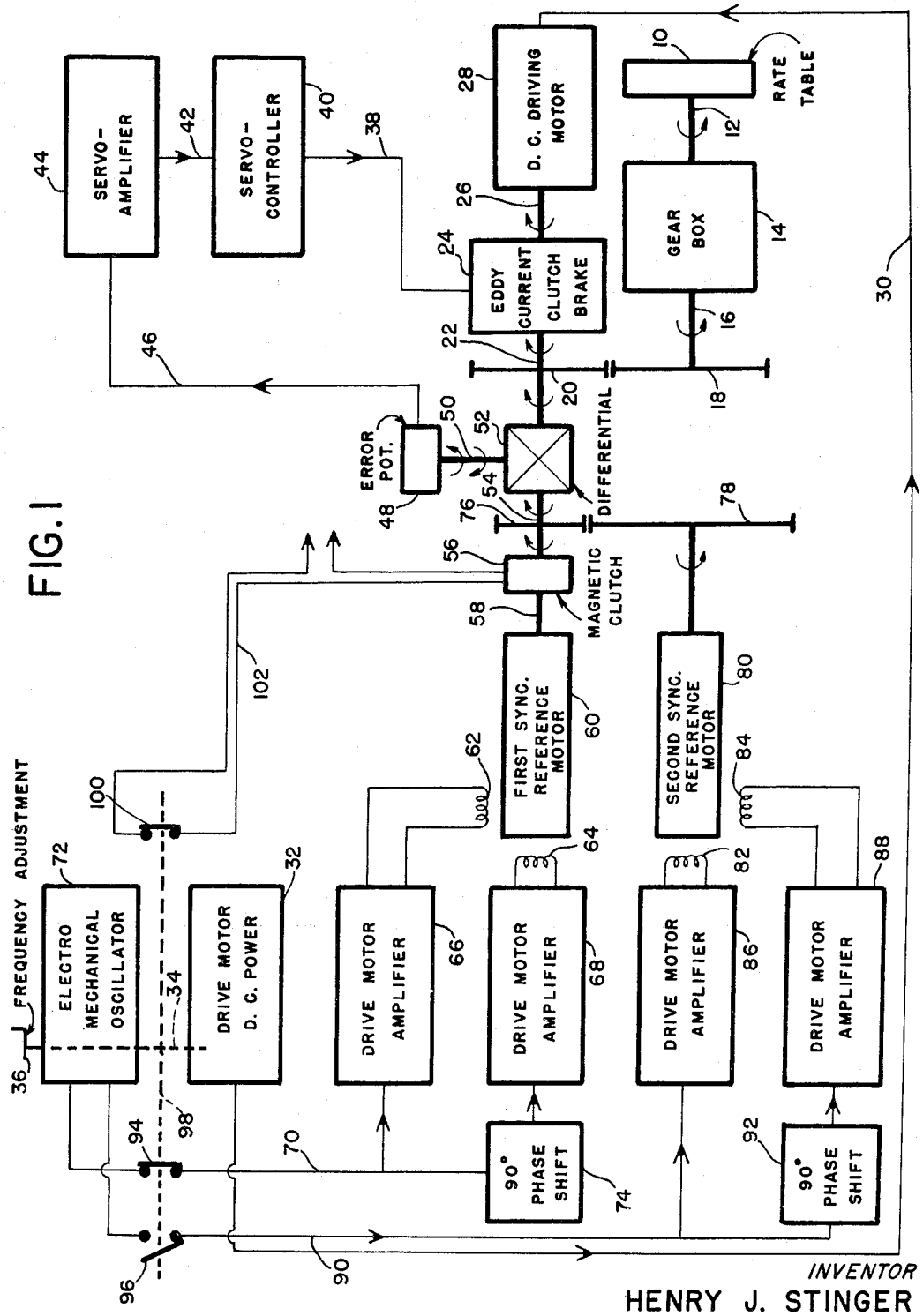
Figure 1 is a schematic diagram of a complete driving motor control system according to the present invention.

As shown in Figure 1, the complete system is designed for operation of a load device 10 throughout a wide range of speed variation. The device 10, for example, may be a rotatable rate table mounted on a shaft 12 and designed for the testing of rate gyroscopes under a broad range of rotational speeds and accelerations. In such an application it is imperative that the speed of rotation of table 10 and shaft 12 be subject to extremely accurate control throughout the desired broad range.

The driving mechanism for table 10 includes a gear box 14 having an input shaft 16 connected to gearing 18 and 20. Gear 20 is fixed to the output shaft 22 of an eddy current clutch brake unit 24. Shaft 26 of a D. C. driving motor 28 supplies power to the input side of the eddy current clutch brake unit. Power for driving motor 28 is supplied through connections 30 from a drive motor D. C. power source 32. The power source 32 is adjustable and is coupled at 34 to a frequency adjustment or speed control member 36 adapted to control the particular speed of rotation of the load device 10. Control member 36 is coupled to the drive motor power source 32 in such a way that power supplied to motor 28 will be sufficient to rotate the motor shaft 26 somewhat faster than the speed required for shaft 22 on the output side of the eddy current clutch brake unit at the particular desired frequency or speed of operation. The eddy current clutch brake 24 is then designed to provide just sufficient slippage to operate its output shaft 22 at exactly the speed necessary to provide the desired rotational speed on load shaft 12.

The extent of slippage permitted by the eddy current clutch brake unit 24 is controlled through connections 38 by which a clutch brake signal is received from a servo-controller 40. This servo-controller is connected in turn at 42 to a servo-amplifier 44 which receives an error signal voltage through connections 46 from an error potentiometer 48. Potentiometer 48 is operated by the output shaft 50 of a differential 52, one side of which is connected to the drive shaft 22 on the output side of the eddy current clutch brake unit 24. The other side of differential 52 is connected to a reference speed shaft 54 which is connected through a magnetic clutch unit 56 or other clutch means with the shaft 58 of a synchronous reference motor 60. Motor 60 is adapted to be operated at an exact reference speed such that reference shaft 54, when directly connected to motor shaft 58 through the magnetic clutch 56, will rotate at exactly the speed desired for the eddy current clutch brake output shaft 22. When the speeds are exactly matched, the speed of differential output shaft 50 will be zero and the error potentiometer 48 will supply no signal to change the eddy current clutch brake operation. On the other hand, if the speed of shaft 22 varies from the desired speed of reference shaft 54, the output shaft 50 of the differential will operate potentiometer 48 to provide an error signal voltage which will in turn operate the eddy current clutch brake through the servo-amplifier and servo-controller to change the amount of slippage and bring the speed of shaft 22 to exactly the desired frequency.

It is essential that the synchronous motor 60 which provides the reference speed be supplied with power at an accurately controlled driving frequency. The control windings 62 and 64 of the reference motor 60 are connected to drive motor amplifiers 66 and 68, respectively. Amplifier 66, in turn, is controlled through a connection 70 with a signal generator, shown in the form of an electromechanical oscillator 72, which will be described in detail below. Drive motor amplifier 68 is also controlled through the connections 70, but with a 90-degree phase shift network 74 connected in known manner to obtain the desired phase difference between motor control windings 62 and 64.

In the system described thus far, the possible range of reference frequencies or speeds which can be supplied to reference shaft 54 will be limited by the possible speed variation in reference motor 60. For certain applications, a range of reference speeds may be desired which is greater than the practical range of variation of a single reference motor 60.

According to one feature of the present invention the reference speed range is therefore broadened by the provision of a gear 76 on reference shaft 54. Gear 76 is driven by a gear 78 on the shaft of another synchronous reference motor 80. Motor 80 has control windings 82 and 84 energized through drive motor amplifiers 86 and 88, respectively. Amplifier 86 is controlled through connections 90 with the electromechanical oscillator 72, while amplifier 88 is similarly controlled but with the interposition of a 90-degree phase shift network 92 as previously described.

Reference motor 80 and the associated gearing 76, 78 are designed for operation of the reference shaft 54 at a higher range of speeds than the speeds obtained through direct coupling with the shaft 58 of the first reference motor 60. As described below, the electromechanical oscillator 72 supplies signals through connection 90 at predetermined frequencies to provide the desired reference shaft speeds. In this case, both motors 60 and 80 are designed for operation within the same general practical speed range. However, the gearing 76, 78 provides the desired higher range of reference shaft speeds when motor 80 is energized.

The signals supplied to the respective drive motor amplifiers through the connections 70 and 90 from the electromechanical oscillator 72 are in turn selectively controlled by switches 94 and 96 in circuit with the connections 70 and 90, respectively. Switches 94 and 96 are mechanically coupled with each other as illustrated schematically at 98 and are also mechanically coupled with a further switch 100 which controls the operation of the magnetic clutch unit 56 through connections 102.

In the system shown in Fig. 1 for purposes of illustration, during operation of the load 10 throughout the lower speed range of shaft 22, the desired reference speed of shaft 54 is supplied from reference motor 60. In other words, switch 94 is closed at the lower speeds, while switch 96 is open. Similarly, switch 100 is closed to maintain the magnetic clutch 56 in engagement and to provide a direct driving connection from motor 60 to reference shaft 54. At these lower speeds of operation, the second reference motor 80 will not be energized, because of the open condition of switch 96, and will merely be driven through the gearing 76, 78 from the reference shaft 54. At the lower speeds for which motor 60 supplies the reference power, the load imposed by the second reference motor 80 is negligible and this direct connection and additional load can be ignored.

At the higher range of speed variations, the speed of reference shaft 54 is controlled by the second reference motor 80. At the particular intermediate frequency or transition speed between the lower and higher speed ranges, both the reference motor 60 and the reference motor 80 will be energized. For this purpose, movement of speed control member 36 to the transition speed setting will close the switch 96 through the mechanical couplings schematically indicated at 98 and 34. Further movement of the speed control member to the higher speed range will open the switches 94 and 100. Thus the energization of the first reference motor 60 will be discontinued and at the same time the magnetic clutch 56 will be disengaged so that at the higher speed range of reference shaft 54 there will be no additional load imposed on the second reference motor 80, as would be the case if the magnetic clutch 56 were omitted and it were necessary for shaft 54 also to drive the deenergized reference motor 60.

In other words, in the system just described, the driving motor 28 has its speed varied in accordance with the setting of the frequency adjustment member 36 so that it always operates faster than necessary, while the eddy current clutch brake unit 24 introduces the necessary slippage in accordance with comparison of the speed of shaft 22 with the speed of reference shaft 54 driven by one or the other or both of reference motors 60 and 80. At the same time the oscillator or signal generator 72 supplies signals of predetermined frequencies for driving the respective reference motors 60 and 80 and is mechanically coupled with the frequency or speed control adjustment 36 to provide automatic change-over from one reference frequency to the other as the desired intermediate speed setting is passed. At the transition speed, both motors are energized. Above this change-over speed the slow speed reference motor 70 is deenergized and is also mechanically disconnected by clutch unit 56 so that it will impose no load to impair the accuracy of comparison at the higher speeds of reference shaft 54.

Figure 2:
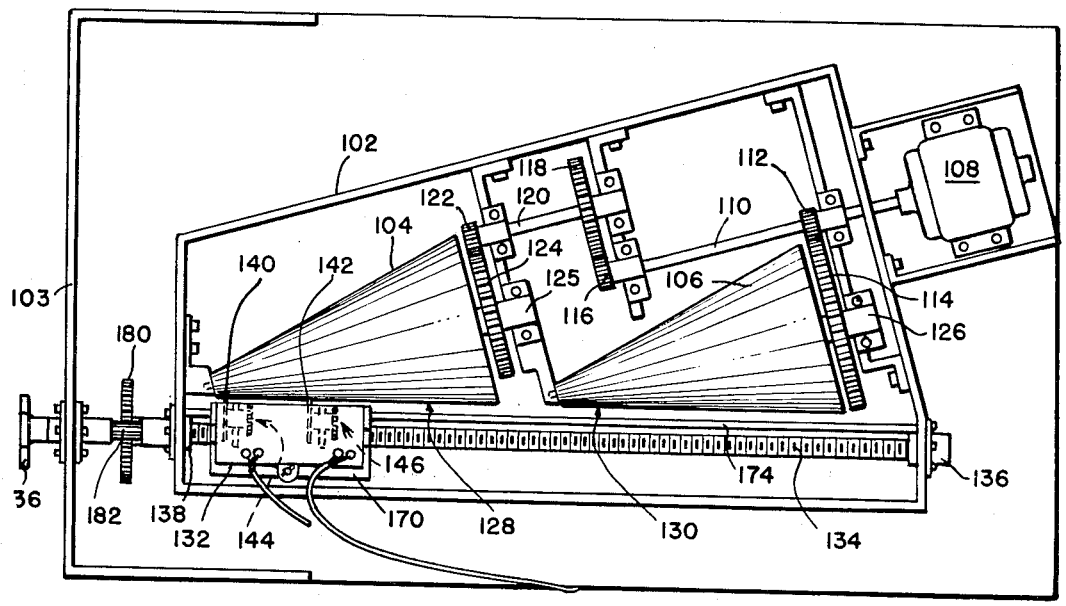
Fig. 2 is a top view showing details of an improved electromechanical oscillator for use in the system of Fig. 1.
Figure 3:
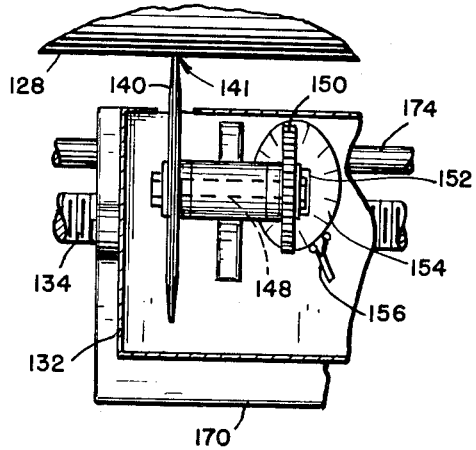
Fig. 3 is an enlarged partial view showing details of a signal generating portion of the oscillator.

While various signal generating devices could be utilized to provide the desired reference frequencies for controlling reference motors 60 and 80, the present invention also contemplates a new and improved electromechanical oscillator for this purpose. This oscillator construction is shown in Figs. 2, 3, and 4. The oscillator itself is mounted in an inner casing or cabinet 102 supported within an outer housing 103 which may also include some of the electrical components such as the amplifiers and drive motor power source of the system described above.

The oscillator uses a plurality of rotating cones 104 and 106 as friction drives for the reference signal generators. While a single cone might be suitable in certain cases, where the desired frequency range is limited, the use of two or more cones is preferred, in combination with plural reference motors and signal generators as described below, in order to obtain a wider range of reference shaft speeds than has been conveniently obtainable by prior devices, and in order to insure smooth transition from one reference motor to the other.

The friction drive cones 104 and 106 are driven by a constant speed motor 108. The shaft 110 of this motor has one gear 112 meshing with a gear 114 on the larger end of cone 106. Motor shaft 110 also has a gear 116 at its far end meshing with a driven gear 118 on an intermediate drive shaft 120. A further gear 122 on intermediate drive shaft 120 meshes with a gear 124 on the large end of friction drive cone 104. Cones 104 and 106 and the gears which are fixed thereto are rotatably mounted in bearings 125 and 126, respectively, in such a manner that the axes of rotation of the cones are parallel to each other. These axes are offset just sufficiently so that the periphery of each cone is tangent to a common line or plane as indicated at 128 for cone 104 and 130 for cone 106. These peripheral portions of the respective cones thus lie in substantially a straight line along which a reference signal generating unit 132 may be adjusted by means of a threaded adjusting rod 134 supported in bearings 136 and 138 of the inner casing 102.

The pick-up unit 132 includes, in this particular case, two signal generators 144 and 146, one of which is shown in further detail in Figure 3. Here the first signal generator 144, which in this embodiment is utilized for generation of the reference signal for control of the first reference motor 60 throughout the lower speed range of the reference shaft, includes a rotatably mounted friction wheel 140, the periphery 141 of which is relatively thin and is adapted for frictional driving engagement with the periphery 128 of cone 104. Friction disk 140 is fixed to shaft 148 which carries a toothed generating wheel 150. The teeth of wheel 150, upon rotation of shaft 148 and friction wheel 140, move past one pole 152 of a magnetic member which has a coil 154 associated therewith. Movement of the teeth 150 past the core 152 thus generates a signal within the coil 154. The frequency of the signal depends on the speed of rotation of the shaft 148 and on the number of teeth on wheel 150. The signal or reference frequency thus generated in coil 154 is connected by leads 156 to the control switch 94 and through the switch to the motor connections 70 for the first or slow speed range reference motor 60.

Similarly, as shown in Figure 4, the second signal generator or pick-up unit 146 includes a second friction wheel 142 having its periphery 143 adapted for engagement with the friction driving cone 106 for rotation of a shaft 158 attached to wheel 142. Shaft 158, in turn, carries another toothed generating wheel 160 which rotates past the core or pole 162 of a magnetic pick-up unit having a coil 164 and leads 166. The signal generated in coil 164 thus also depends on the number of teeth in wheel 160 and on the speed of rotation of shaft 158 and friction wheel 142. The signal frequency generated in coil 164 is connected through leads 166 to control switch 96 and thence to the connections shown at 90 in Figure 1 for energizing the amplifiers for the second reference motor 80, which operates reference shaft 54 through its higher speed range.

In order to maintain the friction wheels 140 and 142 in frictional driven engagement with the periphery of the appropriate cones, the generator body 132 is pivotally mounted at 168 on a carriage 170. The axis of pivot 168 is parallel to the common line or tangent to the two cones so that the unit 132 may rock on pivot 168 toward or away from the periphery of the appropriate cone. Carriage 170 includes depending guide portions 172 which slide longitudinally of the inner casing 102 parallel to the cone edges on a guide rod 174. Carriage 170 also has depending bearing portions 176 and 178 which engage with the threaded rod 134. At least one of the portions 176 and 178 is internally threaded to produce longitudinal movement of the carriage 170 and pick-up assembly 132 along the rods 174 and 134 in response to rotation of threaded member 134.

In order to rotate threaded member 134, the latter is provided at one end with a suitable gear 180 driven by associated gearing including a gear 182 mounted on the shaft 184 of the frequency adjustment control member 36. Rotation of control member 36 thus causes rotation of threaded shaft 134 and longitudinal movement of the pick-up units along the edges of the respective cones.

In order to urge the friction wheels 140 and 142 into driven engagement with cones 104 and 106, the generator unit 132 and supporting carriage 170 are resiliently connected by means of a spring member 186. The tension on spring 186 may be adjusted by a control screw 188. Thus spring 186 resiliently urges the unit 132 around the axis of pivot 168 so that the wheels 140 and 142 are held in the desired frictional driving engagemnt with the cones 104 and 106.

As pointed out above, two cones and two pick-ups are utilized in order to provide a wide range of reference speeds at shaft 84, and a smooth transition from one reference motor to the other at the change-over speed. The driving gearing for the respective cones is selected, in this particular case, so that the speeds of cones 106 and 104 are related to each other by a factor of 4.5 to 1. The respective pick-up wheels 140 and 142 have 45 and 10 teeth, respectively. Because of this relationship of cone speeds and number of teeth, the frequency of the signal generated in the second pick-up unit 146 at the low or small diameter end of its cone 106 will be the same as the initial frequency generated by the pick-up 144 at the small-diameter end of its cone 104. However, the gearing 76, 78 between the respective shafts driven by reference motors 60 and 80 is such that for the same reference frequency, i. e., the same speed of rotation of motors 60 and 80, motor 80 would rotate the reference shaft 54 fatser than reference motor 60 would operate it. In the example illustrated, the gearing 78, 76 is also in the ratio of 4.5 to 1. The diameter at the large end of each cone is similarly related to the diameter at the small end of the cone by a factor of 4.5 to 1, in order to provide a continuous range of speed variation from one cone to the other.

For example, starting with pick-up 144 at the low or narrow end of cone 104, a predetermined initial low reference frequency will be obtained which will energize reference motor 60 to provide a similar low reference speed on reference shaft 54. If the control adjustment member 36 is now operated through its lower speed range to move the associated pick-up units 144 and 146 along the threaded rod 134, the pick-up 144 will move to portions of cone 104 gradually increasing diameter so that the peripheral speed at cone 104 engaging the pick-up wheel 140 will gradually increase. Thus the frequency of the reference signal and the speed of operation of reference motor 60 and shaft 54 will correspondingly increase. When the pick-up wheel 140 reaches the larger end of cone 104, for the assumed ratio of 4.5 to 1 in cone end diameters, the frequency of the signal generated by pick-up 144 will be 4.5 times the initial low reference frequency. For convenience, this frequency may be referred to as the first transition frequency, i. e., the control frequency for first reference motor 60 at the change-over or transition speed. Thus reference motor 60 will operate reference shaft 54 at 4.5 times the predetermined initial low reference speed.

At this point, the parts are so arranged that the second magnetic pick-up 146 will have its friction wheel 142 engaging the narrow end of its associated cone 106. As already explained, the relative speeds of cones 104 and 106 and the relative numbers of teeth in the two pick-ups 144 and 146 are so chosen that the frequency generated by pick-up 146 at the narrow end of its cone 106 (which may be referred to as the second transition frequency, i. e., the control frequency for second reference motor 80 at the transition speed) will be the same as the initial low reference frequency generated at the narrow end of cone 104 by pick-up 144. Thus, at this point, reference motor 60 is operating shaft 54 at 4.5 times the low reference speed, while the second reference motor 80, energized in response to the low frequency signal at the narrow end of cone 106 in pick-up 146, is operating at the low initial reference speed. The 4.5 to 1 gearing at 78, 76, however, results in operation of reference shaft 54 at 4.5 times this low reference speed of motor 80, i. e., at the same speed that reference shaft 54 is operated directly by reference motor 60 when the latter is at the high end of the cone.

In other words, there is a point of transition in which pick-up 144 is generating a high reference frequency at the large end of cone 104 and at which pick-up 146 is generating a low reference frequency signal at the narrow end of cone 106, the ratio of these signals being the inverse of the gearing ratios between the respective reference motors, so that both reference motors 60 and 80 may be energized at this particular transition point and will drive reference shaft 54 at the same reference speed. This arrangement is important in the provision of a continuous speed adjustment from low range to high range.

Further adjustment of the frequency control knob 36 will move the pick-up 146 toward the larger end of its cone 106 and will gradually increase the speed of the second reference motor 80. At the same time, operation of the switch 100 controlling magnetic clutch 56 will disengage the driving connection with the first reference motor 60 so that the speed of reference shaft 54 will depend only upon the speed of the second reference motor 80 without the necessity of rotating motor 60 at these higher speeds. Also, at this transition point, the switch connections 94 and 96 for the respective motors are shifted so that motor 60 will be deenergized during travel of the pick-up 146 along its cone 106, just as the second motor 80 was initially deenergized during movement of the first pick-up 144 along its cone 104.

If the diameters at the large and small ends of cone 106 are also related by a factor of 4.5 to 1, the speed of reference shaft 54 by the time pick-up 146 reaches the large end of cone 106 will be 4.5 times the reference speed at the point of transition. Since this, in turn, was 4.5 times the initial reference speed of shaft 54 when the first pick-up 144 started at the narrow end of its cone 104, it will be apparent that the arrangement shown and described herein provides a continuous range of variation for the speed of reference shaft 54 for a range of approximately 20 to 1. Yet this range is achieved without requiring either synchronous motor to cover a speed range of more than 4.5 to 1.

The actual control of the switches 94, 96, and 100 for energizing the respective motors and the magnetic clutch may be achieved by connecting the switches mechanically with the frequency adjustment mechanism as shown schematically at 98 in Figure 1. While various methods may be used to accomplish this, Figure 4 illustrates the use of a gear 190 on the threaded frequency adjustment shaft 134, meshing with a gear 192 on an intermediate shaft 194. Another gear 196 on the intermediate shaft meshes with a gear 198 on a cam shaft 200. An indicating plate 202 on cam shaft 200 carries a scale 204 cooperating with a pointer 206 to show the particular frequency of adjustment. In this case, the scale is calibrated for reference shaft speeds from 20 to 400 degrees per second, although in practice it may be more convenient to calibrate the scale in terms of degrees or radians per second at load shaft 12. Plural scales may be provided in this case to cover the use of different driving ratios at gear box 14, for the same reference shaft speed ranges.

Cam shaft 200 carries control cams 208 and 210 for the respective switches. Cam 208 has a high portion 212 and a low portion 214, each of which covers substantially half of the periphery of the cam. With the device set in the position of Figure 4 at the lowest initial reference frequency, the high portion of cam 212 holds the switch 94 closed so that signals from the first generator 144 will energize the first reference motor 60 during the lower speed adjustment range in which the first cone 104 is utilized.

During this period the low portion of cam 214 permits switch 96 to remain open so that the second reference motor 80 is deenergized. At these lower speeds, the load imposed on motor 60 to drive deenergized motor 80 is not significant. As the speed adjustment passes the above-mentioned transition point, the high portion 212 of cam 208 will close the switch 96 to energize the second reference motor 80 and immediately thereafter the low portion 214 of cam 208 will permit opening of the switch 94 to deenergize the first reference motor 60.

Similarly, the second control cam 210 has a high portion 216 and a low portion 218, each of which occupies substantially half the periphery of the cam. The high portion 216 of the cam maintains the control switch 100 for the magnetic clutch in closed position throughout the first half of the speed adjustment range, while the low portion 218 of the cam permits opening of the clutch control switch 100 as the transition point is passed. Switch 100 is connected to the magnetic clutch 56 in known manner as shown schematically at 102 in Figure 1, through suitable relays, if desired, so that the clutch 56 maintains the first reference motor 60 in driving engagement with reference shaft 54 throughout the initial range of low speed adjustment, and then disconnects reference motor 60 after the second reference motor 80 has become energized.

As indicated by the foregoing description, a motor control system and electromechanical oscillator have been described which accomplish the objects set forth at the beginning of this specification and which provide an extremely wide and continuous range of accurate speed adjustment for reference shaft 54, and a resulting control for drive motor 28 and load shaft 12 through the eddy current clutch brake unit 24. The use of multiple cones for the oscillator, in combination with the use of plural reference motors 60 and 80, the particular relationship between the driving ratios of the respective reference motors and the frequency ranges of the individual cones, as well as the automatic disengagement of the magnetic clutch at the higher reference speeds, all contribute to the wide range of reference speeds on shaft 54 and the high degree of accuracy at any given reference speed.

With cones about 18 inches long and 12 inches in diameter at their large ends, speed control handle 36 permits adjustment of the frequency to an accuracy within one part in two thousand at any point over the 4.5 to 1 range of frequencies on each cone. In view of the 4.5 to 1 gear ratio between the two reference motors 60 and 80, this accuracy of one part in two thousand is maintained throughout a range of reference shaft speeds of 20 to 1.

In the particular example illustrated, the gear box 14 provides an additional series of four gear ratios between the output shaft 22 of the eddy current clutch brake unit and the rate table 10. With each of these ratios related to the next higher or lower ratio by a factor of 14 to 1, it is possible at the highest ratio to rotate the table at 400 degrees per second and at the lowest ratio at 0.01 degree per second, an over-all ratio of 40,000 to 1. Yet throughout this extremely wide range of speed adjustment for the load device 10, the actual operating speed will be accurately controlled by the eddy current clutch brake unit through comparison of speeds with the reference shaft 54.

Furthermore, adjustment of the speed control handle 36 also varies the drive motor D. C. power source, in such a way that the drive motor shaft 26 will always be maintained at a speed somewhat higher than that of the reference shaft at that setting. The motor shaft speed should be somewhere in the range from 5 to 15 percent above the reference shaft speed, and preferably 10 percent above such reference shaft speed. This should be a speed at which the torque vs. slippage of the eddy current clutch or brake is in its steeply rising portion below the knee of the curve.

The particular manner in which the eddy current clutch and eddy current brake combination controls the slippage to maintain the output shaft 22 at exactly the speed of the reference shaft is also noteworthy, and is especially important where there are wide variations in the actual load. For example, in some phases of gyro testing, it is necessary to tilt the rate table 10 to a non-horizontal plane. With the tested gyro eccentrically mounted, the off-center weight of the gyro will tend to decelerate the table while the gyro is moving upwardly and accelerate the table while the gyro is moving downwardly.

In the present system, however, both the clutch and brake portions of the eddy-current clutch brake combination are normally partly energized to provide the necessary slippage at the desired output shaft speed, i. e. when the speed of shaft 22 corresponds exactly to that of reference shaft 54, with no movement of the error potentiometer. If now the conditions of operations tend to slow the output shaft 22, the differential 52 will move the error potentiometer in a direction such that an error signal of corresponding magnitude and polarity will change the relative energization of the clutch and brake portions. In this case the clutch energization will be increased with respect to the brake energization, thus driving the output shaft 22 more nearly at the motor shaft speed, to the extent required to reestablish synchronism of the output shaft and reference shaft.

Similarly, if the output shaft tends to speed up as compared to the desired reference shaft speed, the differential 52 and error potentiometer 48 will provide an error signal of opposite polarity and corresponding magnitude. This signal, through the servo-amplifier and servo-controller, will change the relative energization of clutch and brake units in the opposite direction-increasing the brake energization with respect to the clutch energization so that the output shaft 22 is held at the desired reference speed.

Thus any accelerating or decelerating forces on the system are quickly compensated. In practice, the accelerating forces are compensated for mainly by the increased action of the eddy-current brake, while the decelerating forces are compensated for primarily through the greater energization of the eddy-current clutch.

The slippage vs. control current characteristics of the eddy-current clutch or brake (which have similar, but converse characteristics) are such that very high sensitivity to small current control changes is possible only at small values of slippage. Hence it is important that the variable speed D. C. driving motor be automatically adjusted to the above-described speed range, preferably 10% above reference shaft speed.

A short time constant for the eddy-current clutch and brake is also an important feature. The device described above has a time constant of about 1/100 of a second, which provides extremely accurate load speed control at the high power level needed for high rate table speeds and rapid accelerations.

Changes and modifications may be made in the specific structure and arrangement of the parts and in the circuit details, in the light of the teachings of this application. The present invention is accordingly intended to include all such modifications and improvements as fall within the spirit and scope of the attached claims.

Now, therefore, I claim:

1. Apparatus comprising at least first and second friction drive cones, a first signal generator having a first friction wheel engaging the periphery of the first cone and movable along the cone thereby varying the speed of rotation of the wheel and the frequency of the resulting signal from the first generator in one range, a second signal generator having a second friction wheel engaging the periphery of the second cone and movable along the cone thereby varying the speed of rotation of the wheel and the frequency of the resulting signal from the second generator in a successive range, and manual speed control means operatively connected to both signal generators for successive movement of the first friction wheel along the first cone followed by movement of the second wheel along the second cone in response to movement of the control means through a predetermined adjustment range thereby to obtain either a signal in said one frequency range or a signal in said successive range.

2. Apparatus comprising at least first and second friction drive cones, a first signal generator having a first friction wheel engaging the periphery of the first cone and movable along the cone thereby varying the speed of rotation of the wheel and the frequency of the resulting signal from the first generator, a second signal generator having a second friction wheel engaging the periphery of the second cone and movable along the cone thereby varying the speed of rotation of the wheel and the frequency of the resulting signal from the second generator, manual speed control means operatively connected to both signal generators for successive movement of the first friction wheel along the first cone followed by movement of the second wheel along the second cone in response to movement of the control means through a predetermined adjustment range, first and second switches connected in circuit with the first and second generators respectively, and means automatically maintaining the first switch closed and the second switch open during movement of the first wheel along the first cone and the first switch open and the second switch closed during movement of the second wheel along the second cone.

3. Apparatus according to claim 2 in combination with a reference speed device having a reference speed shaft and first and second reference motors connected to said reference shaft in predetermined driving ratio to each other, the first motor having a control circuit connected through the first switch to the first generator, and the second motor having a control circuit connected through the second switch to the second generator, said control circuits determining the motor speeds in proportion to the signal frequencies from the respective generators.

4. Apparatus according to claim 3 in which said motors are connected to the reference shaft in a predetermined driving ratio, and in which the cone speeds and signal generators are constructed and arranged to provide a signal frequency at the larger diameter end of one cone which is related to the signal frequency at the smaller diameter end of the other cone in the same ratio as said predetermined driving ratio between the reference motors.

5. Apparatus according to claim 4 having clutch means connecting the reference speed shaft and that reference motor which has the lower driving speed for a given reference shaft speed, and clutch control means operatively disengaging the clutch means during operation of the other reference motor.

6. Apparatus according to claim 5 having means automatically operating said clutch control means and disengaging the clutch when the switch in the control circuit of the clutch-connected reference motor is opened.

7. In combination, means for generating signals of predetermined variable frequency, speed control means for adjustment of the generating means to vary the signal frequency, a reference speed shaft, first and second reference motors connected to said shaft in predetermined driving ratio to each other, first and second motor control circuits connected respectively to the first and second motors and controlling the respective motor speeds in proportion to the frequency of a signal reaching the particular control circuit, and switch means selectively connecting the first and second motors through their respective control circuits to the signal generating means.

8. A signal generator and motor combination according to claim 7 in which said switch means and speed control means are operatively interconnected for automatically energizing only the first motor in response to adjustment of the control means throughout one range of relatively lower reference shaft speeds, and automatically energizing only the second motor in response to adjustment of the control means throughout a relatively higher range of reference shaft speeds.

9. A signal generator and motor combination according to claim 8 in which said lower and higher reference shaft speed ranges overlap at a predetermined transition speed, and said interconnected switch means and speed control means automatically energize both motors in response to adjustment of the control means to said transition speed, the signal generator and motor control circuits at said transition speed energizing the first and second motors at speeds proportional to their predetermined driving ratio to each other.

10. A signal generator and motor combination according to claim 9 having clutch means connecting the reference speed shaft and that reference motor which has the lower driving speed for a given reference shaft speed, clutch control means for operatively disengaging the clutch means during operation of the other motor through said higher range of reference shaft speeds, and means operatively interconnecting said clutch control means and speed control means and automatically disengaging the clutch when the clutch-connected reference motor is deenergized in said higher reference shaft speed range.

11. In combination, first and second signal generators supplying variable frequency signals in predetermined ranges, speed control means movable through a range of adjustment including a lower speed range, a higher speed range and an intermediate transition speed, said speed control means being operatively connected to said first signal generator and controlling the latter to produce therefrom a signal of predetermined initial frequency on movement of the control means to the bottom of said lower speed range and signals of gradually increasing frequency on movement of the control means up through the low speed range until a predetermined first transition frequency is generated at the intermediate transition speed setting, said speed control means being also connected to said second signal generator and controlling the latter to produce therefrom a signal of predetermined second transition frequency at said intermediate speed setting and signals of gradually increasing frequency on movement of the control means up through the high speed range until a predetermined final frequency is generated at the top of the high speed range.

12. The combination according to claim 11 having also a reference speed shaft, first and second reference motors connected to said shaft in predetermined driving ratio to each other, a first motor control circuit connected to the first motor and to the first signal generator and energizing the first motor at speeds proportional to the signal frequencies received from said first generator, and a second motor control circuit connected to the second motor and to the second signal generator and energizing the second motor at speeds proportional to the signal frequencies received from said second generator, said speed control member, said first and second transition frequencies and said first and second control circuits being proportioned and designed for automatic operation of the first and second motors at speeds proportional to their predetermined driving ratio to each other, in response to movement of the speed control member to said intermediate transition speed.

13. A signal generator and motor combination according to claim 12 in which the ratio of said first transition frequency to said predetermined initial frequency is the same as the predetermined driving ratio between said first and second motors, and in which said second transition frequency is the same as said predetermined initial frequency.

14. A signal generator and motor combination according to claim 12 having first switch means and second switch means selectively controlling the energization of the first and second motors respectively, said first and second switch means being operatively connected to said speed control member and automatically energizing only the first motor in response to movement of the speed control member through said lower speed range, energizing both motors in response to movement of the control member to said transition speed, and energizing only the second motor in response to movement of the speed control member through said higher speed range.

15. A signal generator and motor combination according to claim 14 having clutch means connecting the reference speed shaft and the first motor, clutch control means for operatively disengaging the clutch, and means operatively interconnecting said clutch control means and speed control means and automatically disengaging the clutch in response to movement of the speed control means through said higher speed range.

16. A variable speed motor control system comprising a variable speed driving motor having a motor shaft, a reference shaft, means driving the reference shaft at a selected constant reference speed, manual speed control means operatively controlling the reference shaft speed for selection of other constant reference speeds, interconnecting means between said manual speed control means and variable speed driving motor automatically adjusting the motor speed in a limited range above the reference shaft speed established by the speed control means at any given setting, an eddy-current clutch and eddy-current brake combination having an input connected to the driving motor and an output shaft for connection to a desired load, detector means responsive to differences in speed of the output and reference shafts and means adjusting the relative energization of said clutch and brake in response to operation of the detector means and thereby maintaining the output shaft speed in synchronism with each selected reference shaft speed.

17. A motor control system according to claim 16 in which both the eddy current clutch and eddy-current brake are partially energized when the output shaft speed coincides with the reference shaft speed.

18. A variable speed motor control system comprising a variable speed driving motor, an eddy-current clutch and eddy-current brake combination having an input shaft operatively connected to the driving motor and an output shaft for connection to a desired load, manual speed control means movable through a plurality of positions for selection of any desired output shaft speed within a predetermined range, interconnecting means between said manual speed control means and variable speed motor automatically adjusting the input shaft speed in the range from 5 to 15 percent above the particular output shaft speed for which the control means is set, means normally partially energizing both the eddy-current clutch and eddy-current brake and thereby providing both a coupling and braking action establishing a predetermined slippage from input to output shaft exactly sufficient to operate the output shaft at the selected speed, and means automatically responsive to variations in the output shaft speed from the selected speed changing the relative energization of the eddy current clutch and eddy current brake in a direction maintaining the desired output shaft speed.

19. A motor control system according to claim 18 in which said interconnecting means adjusts the driving motor and sets the input shaft speed substantially 10 percent above the selected output shaft speed at any given setting, and in which said automatically responsive means responds to deceleration of the output shaft speed below the selected speed primarily by increasing the energization of the eddy current clutch and also responds to acceleration of the output shaft speed above the selected speed primarily by increasing the energization of the eddy-current brake.

20. A variable speed motor control system comprising a friction drive cone, a signal generator having a friction wheel engaging the periphery of the cone and movable along the cone, means for driving the cone at predetermined speed and means for manual adjustment of the position of the wheel along the cone thereby determining the speed of rotation of the wheel and the frequency of the resulting signal, a reference shaft, means driving the reference shaft in accordance with said resulting signal, a variable speed driving motor having a motor shaft, speed changing means connected to said motor shaft having an output shaft for connection to a desired load, and detector means responsive to differences in speed of the output and reference shafts for controlling said speed changing means to maintain synchronism between said output and reference shafts.

References Cited in the file of this patent

UNITED STATES PATENTS

| | | |
|---|---|---|
| 1,687,233 | Stoller | Oct. 9, 1928 |
| 2,102,911 | Perry | Dec. 21, 1937 |
| 2,171,747 | Gulliksen | Sept. 5, 1939 |
| 2,248,072 | Fry | July 8, 1941 |
| 2,269,434 | Brooks | Jan. 13, 1942 |
| 2,278,654 | Homer et al. | Apr. 7, 1942 |
| 2,437,646 | Matulaitis et al. | Mar. 9, 1948 |
| 2,487,702 | Goodwillie et al. | Nov. 8, 1949 |
| 2,489,725 | Rutemiller | Nov. 29, 1949 |
| 2,551,839 | Jaeschke | May 8, 1951 |
| 2,630,467 | Winther | Mar. 3, 1953 |

OTHER REFERENCES

Electrical Engineers Handbook, "Communication and Electronics," Pender and McIwain, John Wiley & Sons. 1950, pp. 7–91 to 93.